Patented Jan. 13, 1948

2,434,448

UNITED STATES PATENT OFFICE 2,434,448

METHOD OF DETECTION OF SMALL LEAKS IN RECEPTACLES

Charles R. Wade, Evansville, Ind., assignor to Seeger Refrigerator Company, a corporation of Minnesota No Drawing. Application November 1, 1945, Serial No. 626,168

2 Claims. (Cl. 62—170)

The present invention relates to methods of detection of small leaks in pressure restraining receptacles, and is particularly concerned with the testing of refrigeration units of the type employing a compressor, evaporator, and condenser. I desire it to be understood, however, that this method may be employed upon all kinds of refrigeration units, as the method of detecting leaks is of general application.

When Freon 12 or any of the "halogen" refrigerants are being used as the refrigerating medium, according to the methods of the prior art, the best way of detecting minute leaks after the unit has been charged with both refrigerant and oil has been to go over the brazed or soldered joints with what is known as a halide torch. Although this is considered the most sensitive method of the prior art of detecting small leaks, it has been found that it is impracticable to detect all small leaks by this method, especially on a quantity production basis.

One of the objects of the present invention is the provision of an improved method of the detection of small leaks by means of which all small leaks which could not be detected by the methods of the prior art may be immediately detected so that they may be rectified.

Another object of the invention is the provision of an improved method of the detection of small leaks which is practically certain, which is expeditious, which occupies a minimum amount of time and labor, and which utilizes the existing conditions of the refrigeration unit so that the routine of manufacture and charging a unit need not be disturbed, or need only be changed slightly.

Another object of the invention is the provision of an improved method of testing or detection of small leaks, which can be practiced after the unit is practically complete, and which will detect leaks which would otherwise not become evident until several days had elapsed.

Other objects and advantages of the invention will be apparent from the following detailed description of the method and its modifications and the commercial application of this method in the manufacture of refrigerating units.

Modern refrigeration units, which include a compressor, evaporator, condenser, etc., and also secondary refrigeration systems which merely include a condenser, conduits, and evaporator, both have what may be called a closed system; that is, the entire system constitutes a metal container which is liquid-tight and gas-tight, and which encloses the refrigerant and oil and excludes the air and moisture. It is of the utmost importance that such a closed system be absolutely without leaks; and, of course, the most likely points at which leaks may be found would be at the brazed or soldered joints.

According to the prior art, the most sensitive way of determining the presence of leaks, when a refrigerant of the halogen class is used, has been to examine such brazed or soldered joints with what is usually known as a halide torch. Sometimes after a unit has been examined by means of the halide torch, and no leaks found with the most diligent search, after the lapse of a few days, leaks will be evident by the dripping of a very small quantity of oil, but the leak may be so small that one still cannot detect the exact location of the leak by merely trying to trace the oil back to the source of its escape.

The halide torch can be used for the detection of small leaks only when one of the "halogen" refrigerants is being used, such as one containing chlorine, fluorine, bromine, and iodine. All of the Freons and methyl chloride are in the "halogen" group. The halide torch is not effective on other refrigerants, such as sulphur dioxide, ammonia, or carbon dioxide, because of the fact that they are not "halogens." There are, however, sensitive means of detection of small leaks on practically all other refrigerants, except the so-called "halogen" group.

According to the present methods of detection of leaks, a refrigerator unit is first preferably pressure-tested for all large leaks by charging it with hydrogen, nitrogen or air, or any other suitable gas; that is, filling the unit with hydrogen at about 200 pounds per square inch pressure. The unit is then immersed entirely in warm water, and the presence of any bubbling discloses the presence of a leak.

If no leak is found, the hydrogen is then evacuated from the system, and the system is dried out so as to remove any possible trace of moisture. This dehydration is preferably accomplished by successive steps of heating and evacuation of the air, the heat tending to evaporate any moisture, and the evacuation removing the air and moisture from the unit.

Thereafter the unit may be charged with the regular charge of lubricating oil and refrigerant, and the preferred form of refrigerant may be Freon (F-12). This refrigerant, Freon (F-12), is readily miscible with ordinary lubricating oil, and is actually a wetting agent, so that the use of Freon with the lubricant makes it a practical certainty that the entire inside surface of the unit will be wetted. As a further step to insure the wetting of the interior, the unit may be operated for a predetermined period of time by running the motor and compressor and causing the refrigerant to circulate in the regular way.

Such ordinary lubricating oil has fluorescent properties, and, therefore, ordinary mineral oil which is used in refrigerating equipment may be employed according to my method as the fluorescent medium for the detection of leaks.

The present method of detection of leaks is applicable to all refrigerants, because the lubricating oil is carried to all parts of the system after a period of operation, and it is the lubricating oil that has the fluorescent properties. The method is particularly effective when used with Freon 12 because the Freons in general are good wetting agents and are miscible with oil in practically all proportions. Therefore, the internal surfaces of a unit charged with Freon will become covered with an oil film very quickly after the oil is put into operation. With other refrigerants it may take a longer time before the internal surfaces are entirely covered with an oil film.

After the unit has been charged with refrigerant and lubricating oil, and the inside surface of the unit has been wetted with the oil, the pressure of the refrigerant in the system is sufficient to cause the oil to be driven out of any small leaks so that the oil will appear on the surface of the unit. At this time the unit is passed into a test room and illuminated with what may be called "black light." For the present purposes, "black light" may be defined as illumination outside of the ordinary visible spectrum or the invisible radiant energy in the range between 3,000 and 4,000 Angström units.

While it is desirable that the unit be inspected in a darkened room, the darkened room is not necessary because the fluorescence of the oil escaping from leaks under pressure is noticeable, even in a reasonably well lighted room. Therefore, it is not necessary to exclude all visible light.

The present methods are peculiarly valuable for inspection methods under quantity production. The units may be passed through a test room on a conveyor, and a number of sources of the invisible radiant energy may be played upon the unit so as to bring all surfaces of the unit into the path of this invisible light; and in this way a very positive and simple method of inspection is provided.

When such black light is applied to a fluorescent material, such as ordinary mineral lubricating oil, the oil is caused to fluoresce. Fluorescence is a term used to describe the effects which are produced by certain chemical products by which they emit visible light from within themselves during activation by black light. Such fluorescent materials absorb invisible energy, alter its wave length, and emit the energy in the form of a light which is visible to the eye.

When the unit is viewed under black light, soon after it has been charged with refrigerant and lubricating oil, sufficient oil will not have passed out of the small leaks to cover any area, but the exact location of the leaks will be apparent by the fact that the pressure of the refrigerant causes the oil to pass out of the leaks, and the oil fluoresces under the influence of the applied invisible radiant energy.

Then, if any leaks are discovered, the unit is, of course, sent back to have the leaks corrected.

This method of detection of small leaks permits the detection of leaks which would not be apparent by any of the methods of the prior art, and which would not otherwise become apparent until the lapse of a sufficient time for oil to accumulate and drip from the leaks. In other cases the unit may be shipped to the customer, in which case the unit will fail to refrigerate because the refrigerant leaves the unit.

Another modification of my method of detecting small leaks comprises the use of hydrogen under pressure because hydrogen is able to pass through smaller cracks or leaks with greater facility than dry air or nitrogen or refrigerant.

According to this modified method, the inside of the unit would be wetted with mineral lubricating oil by charging the unit with Freon and lubricating oil exactly as described above, and then the charge of refrigerant and lubricant would be removed, leaving the inside of the unit with all surfaces wetted by lubricant. Then the preferred method would be to charge the unit with hydrogen at about 200 pounds per square inch pressure, which would cause the lubricant to escape through any small leaks or cracks, while the unit was located in a dark room and illuminated with "black light."

An additional modification might comprise the application of the pressure to force the lubricant out of the leaks while the unit was at a predetermined elevated temperature, as the lubricant becomes more fluid at higher temperatures and the pressure of the refrigerant increases, and would thus tend to escape the leaks more readily and to aid in the detection of the smallest leaks when the test was conducted at the temperature at which the lubricant is most fluid.

I have found that the present methods of detecting the presence of small leaks are practically certain and that they will detect leaks which could not be detected by any of the methods of the prior art.

Refrigeration units which have been previously subjected to examination with the halide torch, and which would give no indication of any leak by that method, even though the tester knew the location of the leak, were readily tested, and the leaks detected by the present method. Small leaks, which would normally be passed by the methods of the prior art, and which would otherwise cause the return of the refrigerator unit from the field in from six months' to two years' time, can now be readily detected and corrected by my methods.

While I have only referred to the halogen refrigerants in the above description, it is to be understood that the same method of detecting small leaks may be used with other refrigerants, such as sulphur dioxide or ammonia, etc., inasmuch as the lubricating oil has the fluorescent property, and not the refrigerant.

One of the serious objections to the use of any of the halogen refrigerants has been the lack of a sensitive and practical method of detecting small leaks; but this objection will now be eliminated by the use of my present invention.

While I have thus described the preferred modes of carrying out my methods of detection of leaks, I desire it to be understood that I do not wish to be limited to the specific details of the steps described, but desire to avail myself of all changes within the scope of the appended claims.

Having thus described my invention, what I claim as new and desire to secure by Letters Patent of the United States is:

1. The method of testing refrigeration units to detect small leaks which comprises dehydrating the refrigeration unit by application of heat and evacuation of the interior successively in a plurality of steps, charging the refrigeration unit with a predetermined charge of the refrigerant Freon and mineral lubricating oil, the refrigerant acting as a wetting agent to cause the lubricant to wet the interior of the unit, operating the unit to insure distribution of lubricant throughout the interior of the unit, removing the charge of Freon and subjecting the interior of the unit to hydrogen under pressure, the unit being at a predetermined temperature to insure fluidity of the lubricant and the said lubricant acting as a fluorescing agent, and subjecting the exterior of the unit to the action of radiant energy of a wave length below that of visible light in a dark place to cause the lubricant which is forced out of small leaks by the hydrogen under pressure, to fluoresce at the point of leakage.

2. The method of testing refrigeration units to detect small leaks, which comprises charging the refrigeration unit with a predetermined charge of the refrigerant Freon and mineral lubricating oil, the refrigerant acting as a wetting agent to cause the lubricant to wet the interior of the unit, operating the unit to insure distribution of lubricant throughout the interior of the unit, removing the charge of Freon and subjecting the interior of the unit to hydrogen under pressure, raising the temperature of the unit to a predetermined temperature to increase the fluidity of the lubricant, whereby the hydrogen and heated lubricant are adapted to produce exposure of lubricant on the outside at the most minute leaks, and subjecting the exterior of the unit to the action of radiant energy of a wave length below that of visible light in a dark place, to cause the lubricant which is forced out of small leaks by the hydrogen under pressure to fluoresce at the point of leakage.

CHAS. R. WADE.

REFERENCES CITED

The following references are of record in the file of this patent:

UNITED STATES PATENTS

| Number | Name | Date |
|---|---|---|
| 2,096,099 | Gangler | Oct. 19, 1937 |